(12) United States Patent
Belley et al.

(10) Patent No.: US 6,909,836 B2
(45) Date of Patent: Jun. 21, 2005

(54) MULTI-RATE REAL-TIME PLAYERS

(75) Inventors: Benoit Belley, Montreal (CA); Pierre P. Tremblay, St-Lambert (CA)

(73) Assignee: Autodesk Canada Inc., Montreal (CA)

( * ) Notice: Subject to any disclaimer, the term of this patent is extended or adjusted under 35 U.S.C. 154(b) by 892 days.

(21) Appl. No.: 09/779,252

(22) Filed: Feb. 7, 2001

(65) Prior Publication Data

US 2002/0106184 A1 Aug. 8, 2002

(51) Int. Cl.$^7$ .......................... H04N 5/76; H04N 5/781
(52) U.S. Cl. ........................... 386/52; 345/547
(58) Field of Search .................. 386/4, 45, 52, 386/55, 64, 125, 126; 360/13; 369/83; 345/501–505, 530–532, 535–536, 547; 711/100; H04N 5/76, 5/781

(56) References Cited

U.S. PATENT DOCUMENTS

| | | | |
|---|---|---|---|
| 4,500,908 A | | 2/1985 | Mandeberg |
| 4,876,600 A | | 10/1989 | Pietzsch et al. |
| 5,317,686 A | * | 5/1994 | Salas et al. ................. 715/503 |
| 5,805,148 A | | 9/1998 | Swamy et al. |
| 6,154,213 A | * | 11/2000 | Rennison et al. ........... 715/854 |
| 6,172,669 B1 | * | 1/2001 | Murphy et al. ............. 345/601 |
| 6,661,422 B1 | * | 12/2003 | Valmiki et al. ............. 345/530 |
| 6,762,762 B2 | * | 7/2004 | MacInnis et al. ........... 345/503 |
| 6,798,420 B1 | * | 9/2004 | Xie ............................ 345/554 |

FOREIGN PATENT DOCUMENTS

WO    WO98/10586    3/1998

OTHER PUBLICATIONS

Mason Woo et al., *OpenGL Programming Guide*, Third Edition, The Official Guide to Learning OpenGL, Version 1.2, Chapter 1: Introduction to OpenGL, pp. 1–25, ©1999.

* cited by examiner

*Primary Examiner*—Thai Tran
(74) *Attorney, Agent, or Firm*—Gates & Cooper LLP

(57) ABSTRACT

A method of optimizing the scheduling of the drawing of graphical elements of a multi-player display (102) in an image processing environment. Each player (801 to 804) is capable of operating asynchronously and deriving its source from a different video, film or other image format. Draw commands from each player are combined into short sequences known as graphics requests (1002 to 1004). A scheduler (821) selects the next graphics request for rendering by a graphics thread (831) based on the requirement to minimize state changes within the graphics card (208) while meeting the due time requirement of the graphics request, that is dependent upon the frame rate.

30 Claims, 15 Drawing Sheets

MULTI-RATE REAL-TIME PLAYERS

BACKGROUND OF THE INVENTION

1. Field of the Invention

The present invention relates to rendering a plurality of asynchronous players on a single visual display, wherein each player is capable of rendering moving images at an arbitrary frame rate.

2. Description of the Related Art

The increasing use of digital systems to process images has resulted in the availability of systems that are capable of processing a wide variety of image types, including moving images from video and film, and virtual worlds generated from animations of three-dimensional geometric data. In a system that only has to deal with one particular data type, for example, video frames at a rate of thirty frames per second, it is possible to implement digital processing circuitry that operates synchronously with the frame rate, and considerable optimisations are thereby obtained.

As digital systems become increasingly complex, it has become customary to display several images on a visual monitor at the same time. These images are typically single frames from several clips, whose contents are to be edited together to form a final scene. Sometimes these clips are from several cameras viewing the same scene, and it is known to display moving images from several synchronous clips at the same time, so a director can make a best choice as to which camera angle to use without viewing each one separately.

In a typical compositing environment, clips may be derived from several diverse sources, including various film and video formats, having different frame rates and resolutions. Known image processing systems require that these be converted into a common format before they can be freely viewed, mixed and edited together during the video editing process. Displaying clips having different frame rates, in particular, is not done, due to excessive demands that would be made upon the graphics rendering process in order to achieve this.

Graphics rendering is typically performed by a highly optimised graphical signal processing circuit. This has many levels of pipelining in order to ensure that maximum performance is achieved for a given amount of silicon circuitry. However, switching between clips in different formats requires that pipelines in the graphics circuitry are cleared, and this will incur a prohibitive performance penalty on systems that attempt to freely display several different formats of image data. Furthermore, when several players are used to display clips having different frame rates, the necessity to switch between the different players rapidly increases this pipeline clearing overhead, making such a system impractical or very expensive to implement. In known systems, therefore, only one format is displayed at a time. Multiple formats can be represented by still frames, and these may then be previewed at high quality by adjusting the system to deal exclusively with that format while it is being viewed or edited. High quality combination of image types on the same display is only done by explicit conversion into a common format prior to editing.

BRIEF SUMMARY OF THE INVENTION

It is an aim of the present invention to provide an improved method of simultaneously displaying multiple clips, each having potentially a different frame update rate, and thus providing an efficient mean of performing computational load balancing by establishing priority between the clips.

BEST MODE FOR CARRYING OUT THE INVENTION

The invention will now be described by way of example only with reference to the accompanying drawings.

Figure 1:
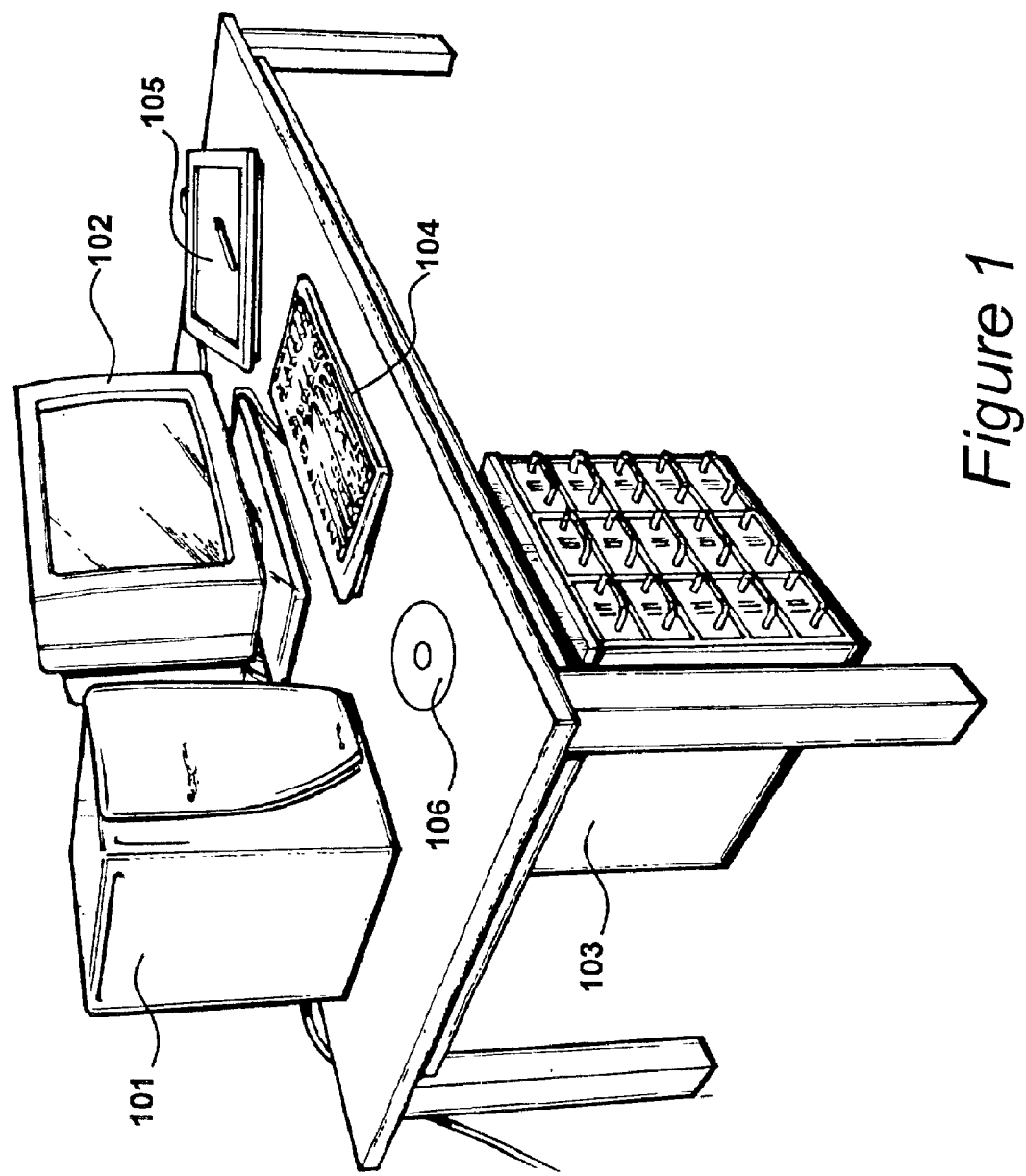
FIG. 1 shows an image processing system, including a computer and a monitor.

A system for processing image and other data is illustrated in FIG. 1. A processing system 101, such as an Octane™ produced by Silicon Graphics Inc., supplies image signals to a video display unit 102. Moving image data is stored on a redundant array of inexpensive discs (RAID) 103. The RAID is configured in such a way as to store a large volume of data, and to supply this data at a high bandwidth, when required, to the processing system 101. The operator controls the processing environment formed by the processing system 101, the video monitor 102 and the RAID 103, by means of a keyboard 104, and a stylus-operated graphics tablet 105.

Instructions controlling the processing system 101 may be installed from a physical medium such as a CDROM disk 106, or over a network, including the Internet. These instructions enable the processing system 101 to interpret user commands from the keyboard 104 and the graphics tablet 105, such that moving image data, and possibly other media data, may be viewed, edited and otherwise processed to define a scene. A short sequence of video frames, for example from one particular camera, is known as a clip. A scene may be constructed from a number of clips, usually arranged sequentially, although certain effects may combine two or more clips simultaneously. Typically, the video material will include a mono or stereo soundtrack, which may be heard through loudspeakers contained in the video monitor 102 or through headphones. Other data, including camera motion tracking data, may be supplied to the processing system 101 via various hardware interfaces. Scene data, including clips and sound, may be loaded via a high capacity network, stored on the RAID 103, and then manipulated in real time in order to facilitate high quality preview and rendering of the final results of image processing.

Figure 2:
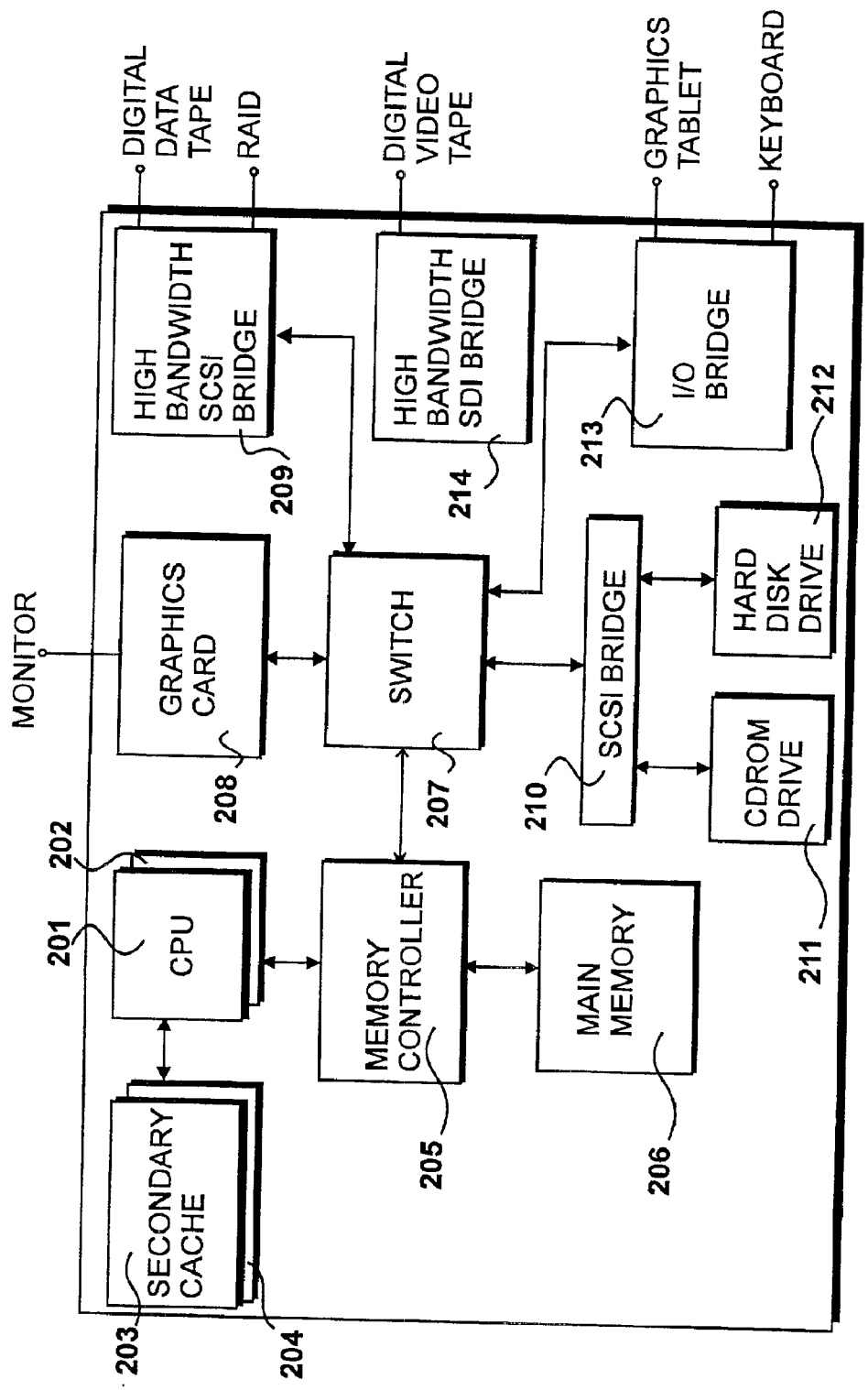
FIG. 2 details main components of the computer shown in FIG. 1, including a main memory and a graphics card.

The processing system 101 shown in FIG. 1 is detailed in FIG. 2. The processing system comprises two central processing units 201 and 202 operating in parallel. Each of these processors is a MIPS R12000 manufactured by MIPS Technologies Incorporated, of Mountain View, Calif. Each of these processors 201 and 202 has a dedicated secondary cache memory 203 and 204 that facilitate per-CPU storage of frequently used instructions and data. Each CPU 201 and 202 further includes separate primary instruction and data cache memory circuits on the same chip die, thereby facilitating a further level of processing improvement. A memory controller 205 provides a common connection between the processors 201 and 202 and the main memory 206. The main memory 206 comprises two gigabytes of dynamic RAM.

The memory controller 205 further facilitates connectivity between the aforementioned components of the processing system 101 and a high bandwidth non-blocking crossbar switch 207. The switch makes it possible to provide a direct high capacity connection between any of several attached circuits. These include a graphics card 208. The graphics card 208 generally receives instructions from the processors 201 and 202 to perform various types of graphical image rendering processes, resulting in images, clips and scenes being rendered in real time on the monitor 102. A high bandwidth SCSI bridge 209 provides an interface to the RAID 103, and also, optionally, to a Digital Data Tape recorder and playback apparatus. A high bandwidth SDI bridge 214 provides an interface to a Digital Video Tape recorder and playback apparatus. Digital tape is a commonly used medium for the storage of high quality video or cinematic clips. Images of this nature are typically transferred locally from a digital tape player or via a high speed network, onto the RAID 103, prior to image processing being performed. Once image processing has been completed, the resulting clips and scenes are transferred back to digital tape.

A second SCSI bridge 210 facilitates connection between the crossbar switch 207 and a CDROM drive 211. The CDROM drive provides a convenient way of receiving large quantities of instructions and data, and is typically used to install instructions for the processing system 101 onto a hard disk drive 212. Once installed, instructions located on the hard disk drive 212 may be fetched into main memory 206 and then executed by the processors 201 and 202. Furthermore, the hard disk drive may store important data structures representing scene data and or ways of manipulating video or film clips, which may be updated from one image processing session to the next. An input output (I/O) bridge 213 provides an interface for the graphics tablet 105 and the keyboard 104, through which the user is able to provide instructions to the processing system 101.

While processing image data using the system shown in FIG. 1, it is advantageous to the user to be able to preview several different scenes and clips simultaneously. Image processing typically combines several clips, and it is therefore convenient for the user to be able to see these at the same time. As image processing systems increase in their capacity to deal with several different formats of digital image data, and even media of many different kinds, it is preferable for the user to be able to view images of any kind of format, simultaneously on the same screen. Historically, video monitors have operated at a fixed frame rate, such as fifty or sixty frames a second, and material supplied to this type of monitor is synchronous with the monitor's frame rate. However, despite the advent of modern video display units providing screen refreshment rates as high as a hundred frames per second, the requirement for strict synchronisation remains and simultaneous rendering of clips having different frame rates presents considerable difficulties, as will be detailed later.

In the present embodiment, the image processing system shown in FIG. 1 is capable of displaying a plurality of windows on the monitor 102. Within the context of image processing, each of these windows is termed a player, and each player may be considered as operating independently and asynchronously of the other players that are being displayed at the same time, on the same monitor 102. Image processing actions performed by a user are typically referred to as compositing.

Figure 3:
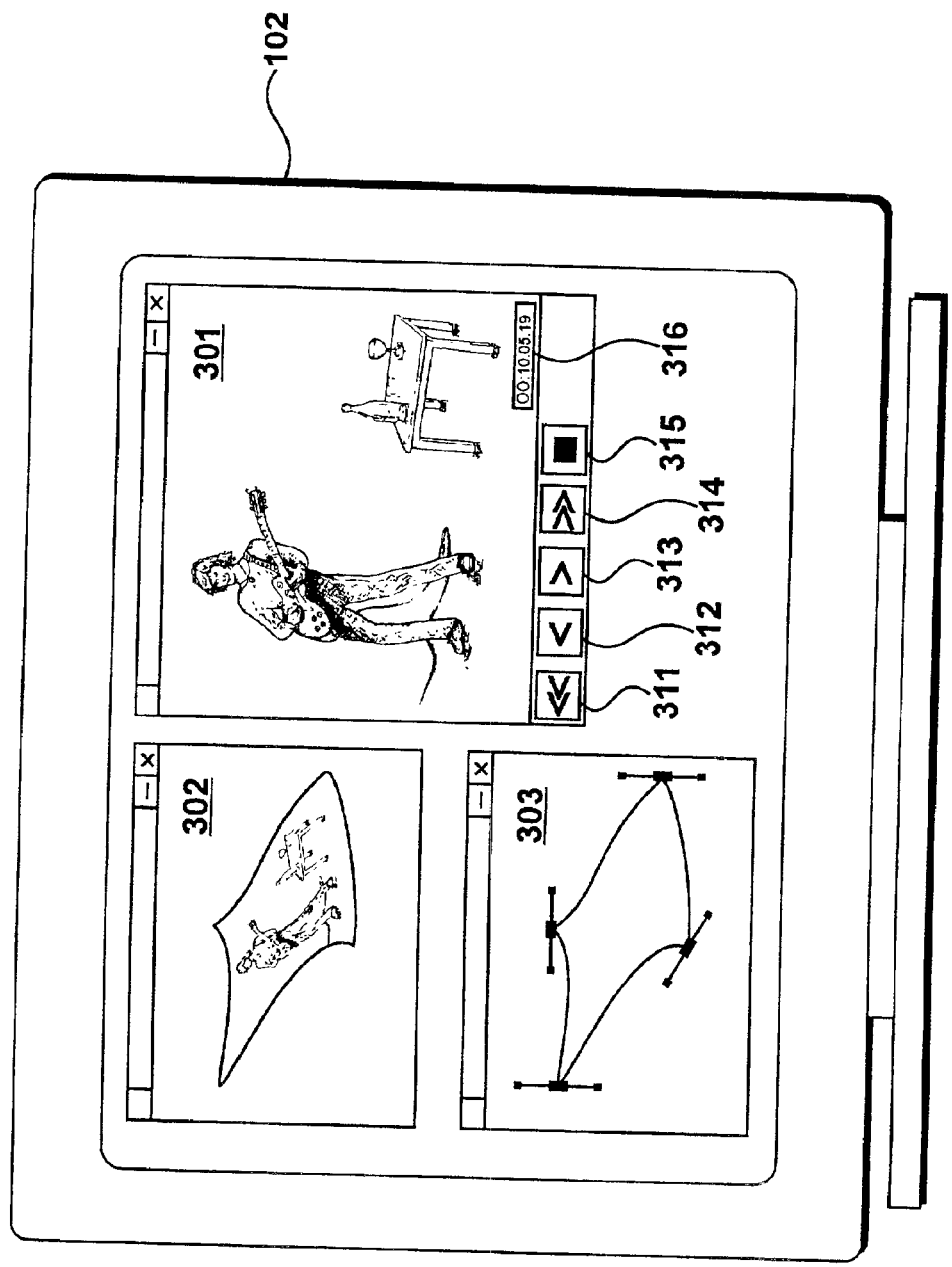
FIG. 3 details an image displayed on the monitor shown in FIG. 1 during image processing.

An example of multiple players used for compositing is shown in FIG. 3. The monitor 102 has a display area that contains three players 301, 302 and 303. Each of these players provides a different view onto various aspects of a scene's construction. The first player 301 is being used by the operator to view high quality video frames at a rate of thirty frames per second. Transport controls are provided for rewind 311, reverse play 312, forward play 313, fast forward 314 and stop 315. An SMPTE standard timecode display 316 provides an indication of elapsed time of the clip being displayed in the window. The second player 302 is being used by the user to define the trajectory of a curved surface onto which the image being shown by the first player 301 is being projected. The third player 303 is being used by the user to define the shape of the surface being used for the projection shown by the second player 302.

To save processing time, the user has decided to preview frames on the second player 302 at a rate of fifteen frames per second. The view of the third player 303 needs only to be updated as often as possible, when processing resources become available. In the present embodiment, user interface components such as tape transport controls 311 to 316 may be considered as a degenerate form of player, which may have an update rate independent of the other players. Usually it is preferable to update user interface (UI) components (commonly referred to as widgets) at as high a rate as possible, but without interfering with the quality of an output render process.

The ability to display several different views asynchronously on the same screen provides many advantages to the user of such a system. However, it is extremely important that the results of image processing operations performed in this environment should be viewable at a high level of quality. High quality is essential if correct edit decisions are to be made. If the extra processing required by placing several asynchronous players on the same display becomes too high, this will result in the processing system 101 not being able to keep up with the demands being placed on it, resulting in dropped frames, and a significant loss in the quality of rendered images. If the quality of images cannot be maintained, the advantages of placing several players on the screen at the same time are outweighed by the inability of the operator to reliably view the results of his or her editing decisions.

Figure 4:
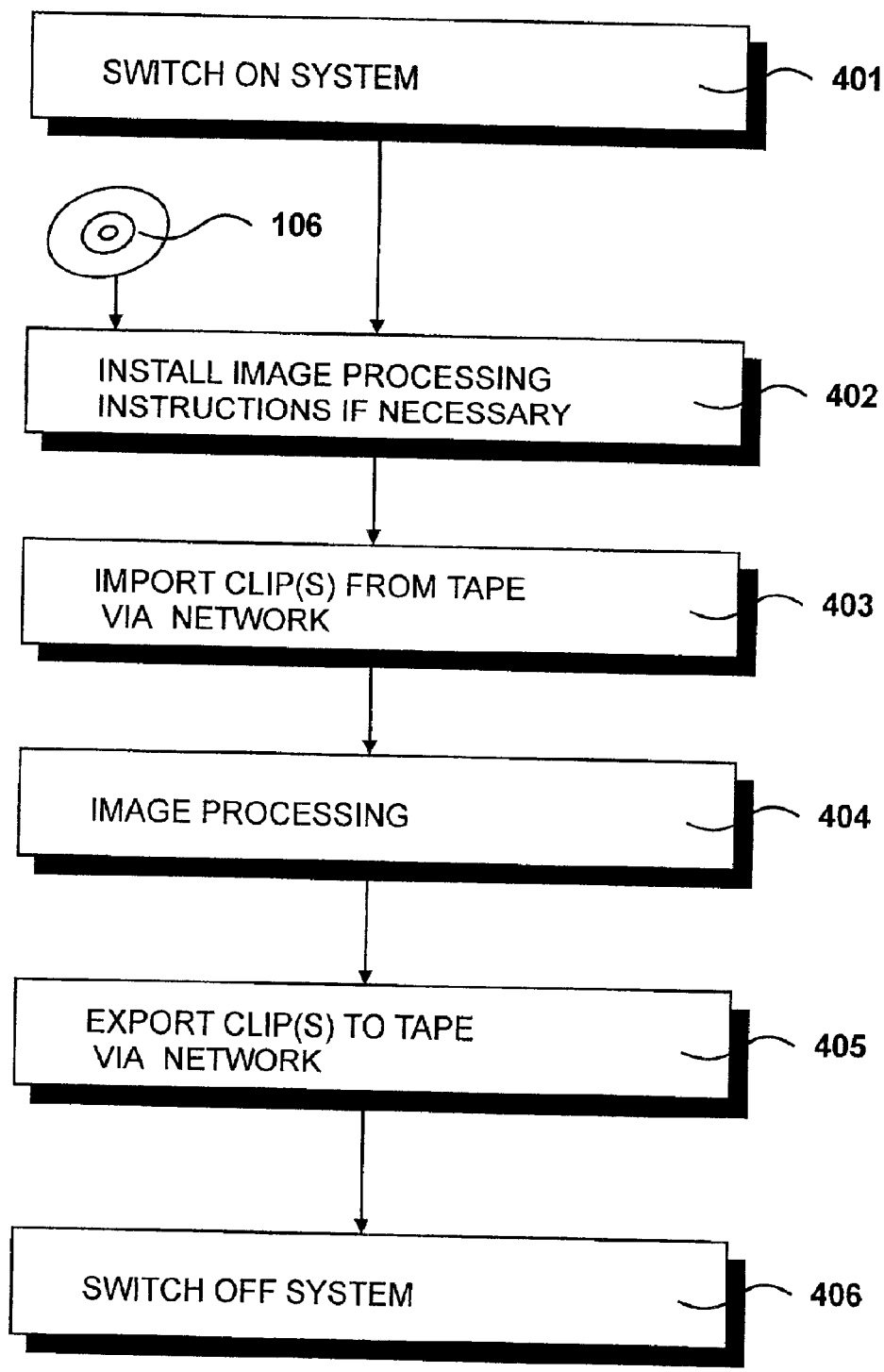
FIG. 4 summarises operations of the image processing system shown in FIG. 1, including a step of image processing.

Operations of the image processing system shown in FIG. 1 are summarised in FIG. 4. At step 401 the system is switched on, and the processing system 101 loads operating system instructions for initial operation. At step 402, if necessary, instructions for image processing are installed onto the hard disk drive 212 from the CDROM drive 211, or possibly from a network such as the Internet. At step 403 clips are imported as necessary from digital tape, which may be from a digital tape player connected directly to the processing system 101 or over a high bandwidth network connection.

Image processing is performed at step 404. This includes compositing actions, editing, additional import and export of image and other media types, and generally all those steps that are required to form a finished clip or scene. At step 405 the finished clips are stored back onto digital tape and at step 406 the system is closed down and switched off.

Figure 5:
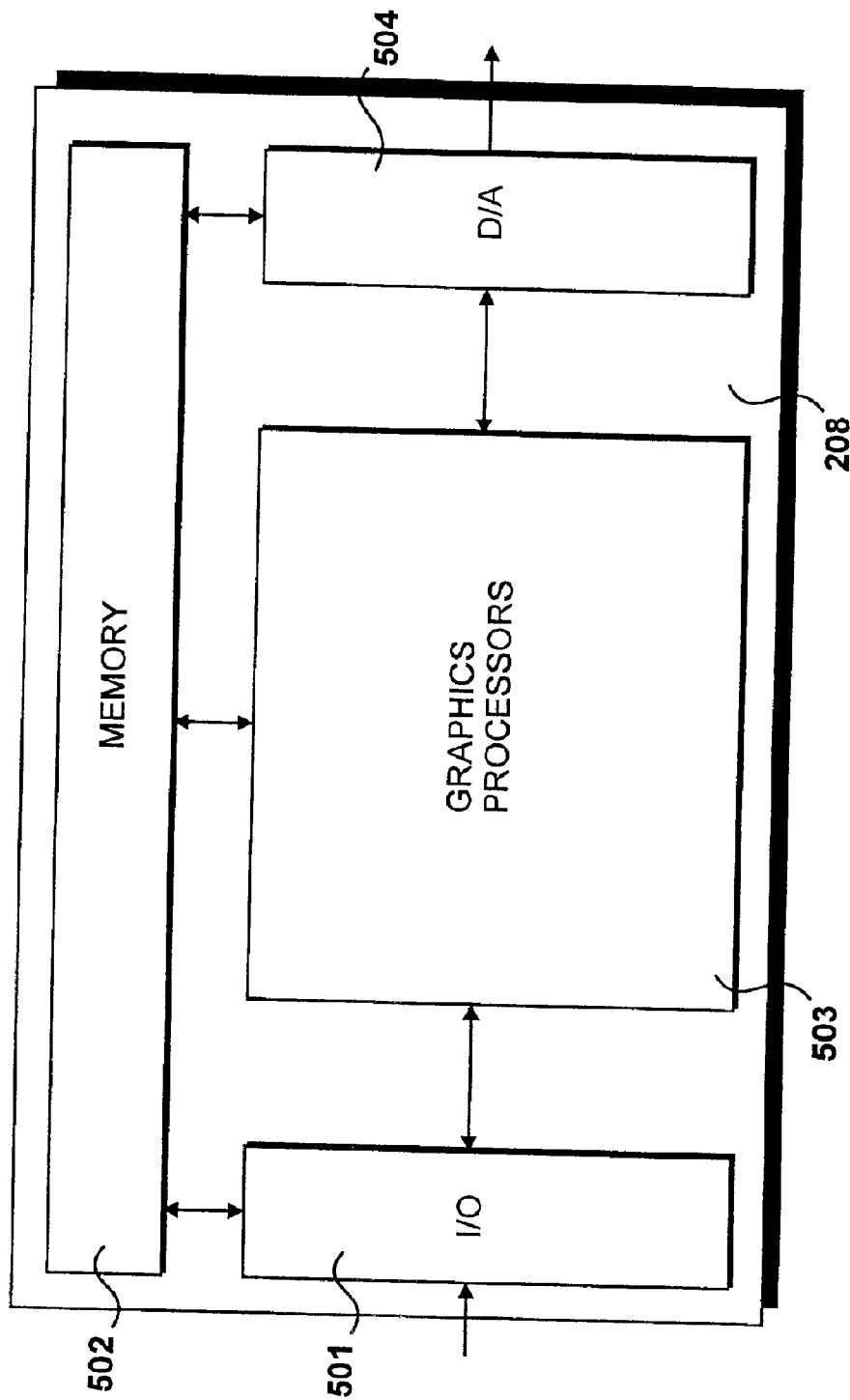
FIG. 5 summarises hardware components of the graphics card shown in FIG. 2.

The graphics card 208, first shown in FIG. 2, has its main hardware components summarised in block form in FIG. 5. A connection between the graphics card 208 and the crosspoint switch 207 is made by an input output circuit 501, that comprises address and data connections, buffers, encoders, decoders and control interfaces. The input output circuit 501 facilitates a direct connection to the memory 502 and multiple graphics processors 503. A digital to analogue converter 504 converts digital color values into analogue form, suitable for direct supply to the monitor 102. All types of graphics card include the arrangement summarised in FIG. 5. Depending on the types of graphics rendering that is to be performed, the details of the graphics card circuitry, particularly in the arrangement of the memory and graphics processors, may differ considerably. In image processing applications, it is common to require a combination of two dimensional and three dimensional graphical capabilities, and these must usually be performed with a high level of computational efficiency.

In order to meet the demands of common image processing requirements, the OpenGL standard has been developed. This defines a set of methods for controlling drawing processes that can be performed on a wide variety of graphics hardware. Interpretation of OpenGL drawing commands is performed by an OpenGL state machine. This may be implemented either by instructions executing on the CPUs 201 and 202, or, as in the preferred embodiment, in dedicated hardware components optimally configured to render OpenGL commands, located in the graphics card itself.

Figure 6:
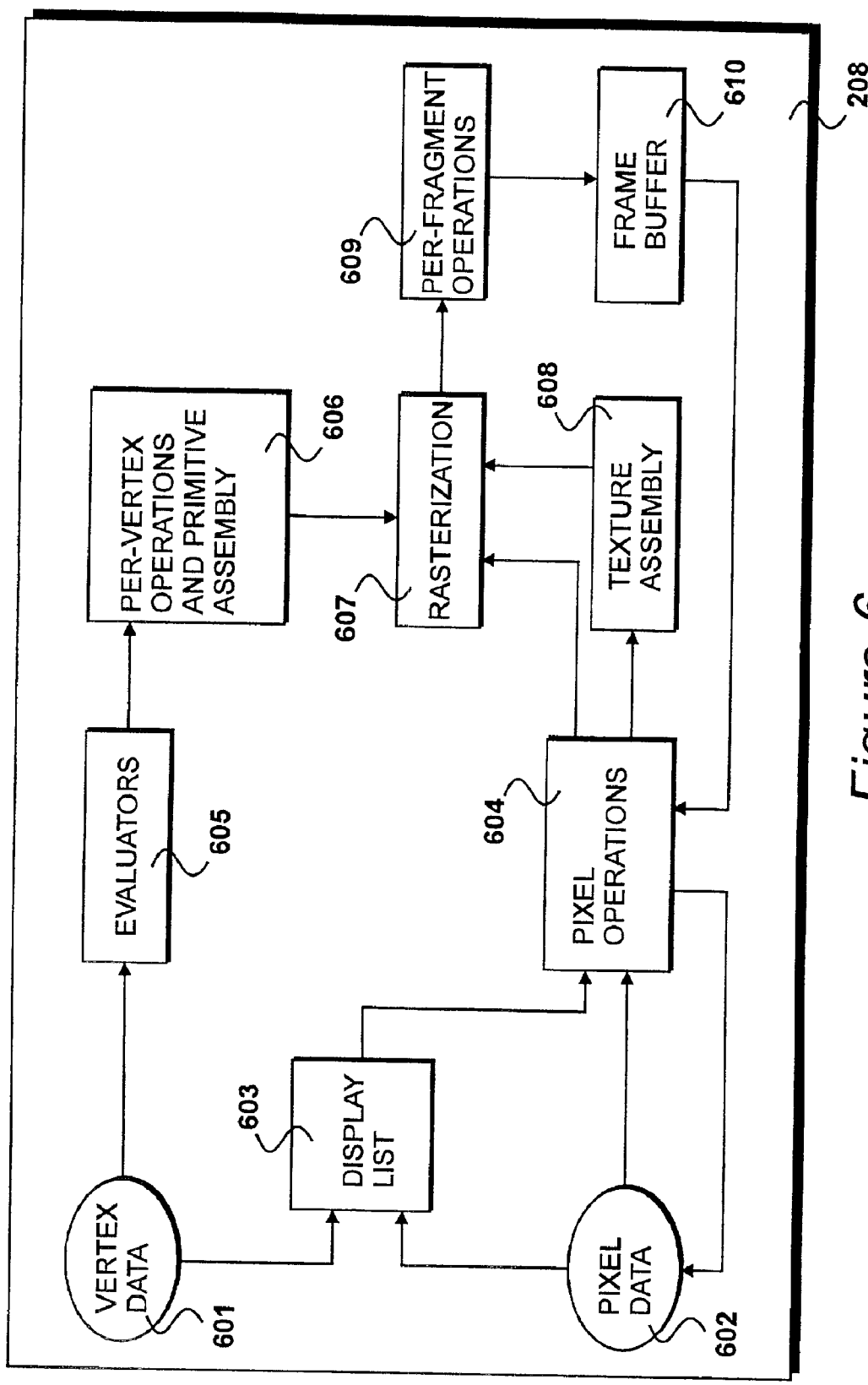
FIG. 6 details operational characteristics of the graphics card shown in FIG. 2.

The OpenGL state machine is summarised in FIG. 6. The hardware components of the graphics card shown in FIG. 5 are configured in such a way as to implement the state machine shown in FIG. 6 with a high degree of efficiency. This requires a combination of hardware, software and multiple state machines configured in highly complex ways, so as to ensure the highest possible level of efficiency from the minimum amount of custom silicon circuitry.

The OpenGL state machine performs processing upon two fundamental types of data. These are vertex data 601 and pixel data. Vertex data 601 defines points that are to be joined by lines and possibly areas that are to be shaded in some way. Pixel data 602 includes raw image data such as that supplied from digitised film clips, and also texture maps. The full details of the various components 601 to 610 of the OpenGL state machine may be found in chapter 1 of the OpenGL Programming Guide, Third Edition, published by Addison-Wesley, ISBN 0-201-60458-2, as well as several widely available sources on the Internet. Each of these components 601 to 610 has associated with it certain state variables, which define how that stage of the state machine is to operate. For example, a particular state variable may define whether or not to apply Gouraud shading to an area. A complete set of the state variable for the state machine shown in FIG. 6 is known as an OpenGL context, or simply a context.

Efficient hardware implementations of the OpenGL state machine shown in FIG. 6 rely heavily on the use of pipelining. Pipelining breaks down complicated processes into several simple stages, each of which can perform simultaneously at a higher speed than a non-pipelined version of the process. An example is multiplication. A multiplier may be implemented to generate the product of two values in one hundred nanoseconds using a non pipelined process, or in ten nanoseconds using a ten stage pipelined process. In the latter case, results still take one hundred nanoseconds to appear, but new inputs and outputs can be supplied and received from the multiplier circuit at a rate ten times higher than this. In most situations, a delay of one hundred nanoseconds is not as important as the overall throughput of the process, which is one new result every ten nanoseconds. Pipelining can be thought of as an assembly-line process.

In a typical OpenGL hardware implementation, pipelining techniques are extensively used. Once all the state variables are set correctly, and the assembly-line process is functioning in a predictable way, the efficiencies brought to graphics rendering by this technique are considerable. However, when one or several state variables are changed, the conditions of the assembly line are modified, and this requires a process of flushing a pipeline. As the depth of a pipeline is not fixed, and the pipeline may use first-in-first-out buffers, this flushing task can take a variable amount of time and a potentially large corresponding number of CPU clock cycles. If several concatenated pipelines have to be cleared, the performance penalty of pipeline flushing can be very severe. For this reason it is preferable to minimise the amount of changes that are made to the OpenGL state machine during the process of graphics rendering.

OpenGL was developed with the intention of improving the efficiency of rendering an image or a sequence of moving images. Once the state variables are correctly set, an OpenGL optimised graphics card can perform with extremely high efficiency, and render complex photorealistic scenes in real time. However, in the known art, if multiple players were displayed simultaneously on the same screen 102, using the same graphics card 208, the differing state requirements from player to player would result in the requirement to change OpenGL state variables, or possibly even complete OpenGL contexts at a rate that would significantly impair the capability of such a system to render moving images of a high quality. This reduction in efficiency would be sufficient to prevent such an arrangement being useful in a competitive image processing environment.

OpenGL is a widely adopted standard for communicating with Graphics cards, and as a result many graphics card are designed to implement the OpenGL state machine using customised silicon circuitry specifically tailored to the requirements of the OpenGL state machine. However, any efficient hardware implementation of graphics rendering functions will employ a level of pipelining, and will thus benefit from the invention that will be described herein. Furthermore, it is known to perform OpenGL rendering using software running on the main CPUs 201 and 202. Under these conditions the level of pipelining is typically much reduced. Nevertheless, the invention will provide benefits even when most of the rendering processes are performed on the general purpose CPUs of the processing system 101.

Figure 7:
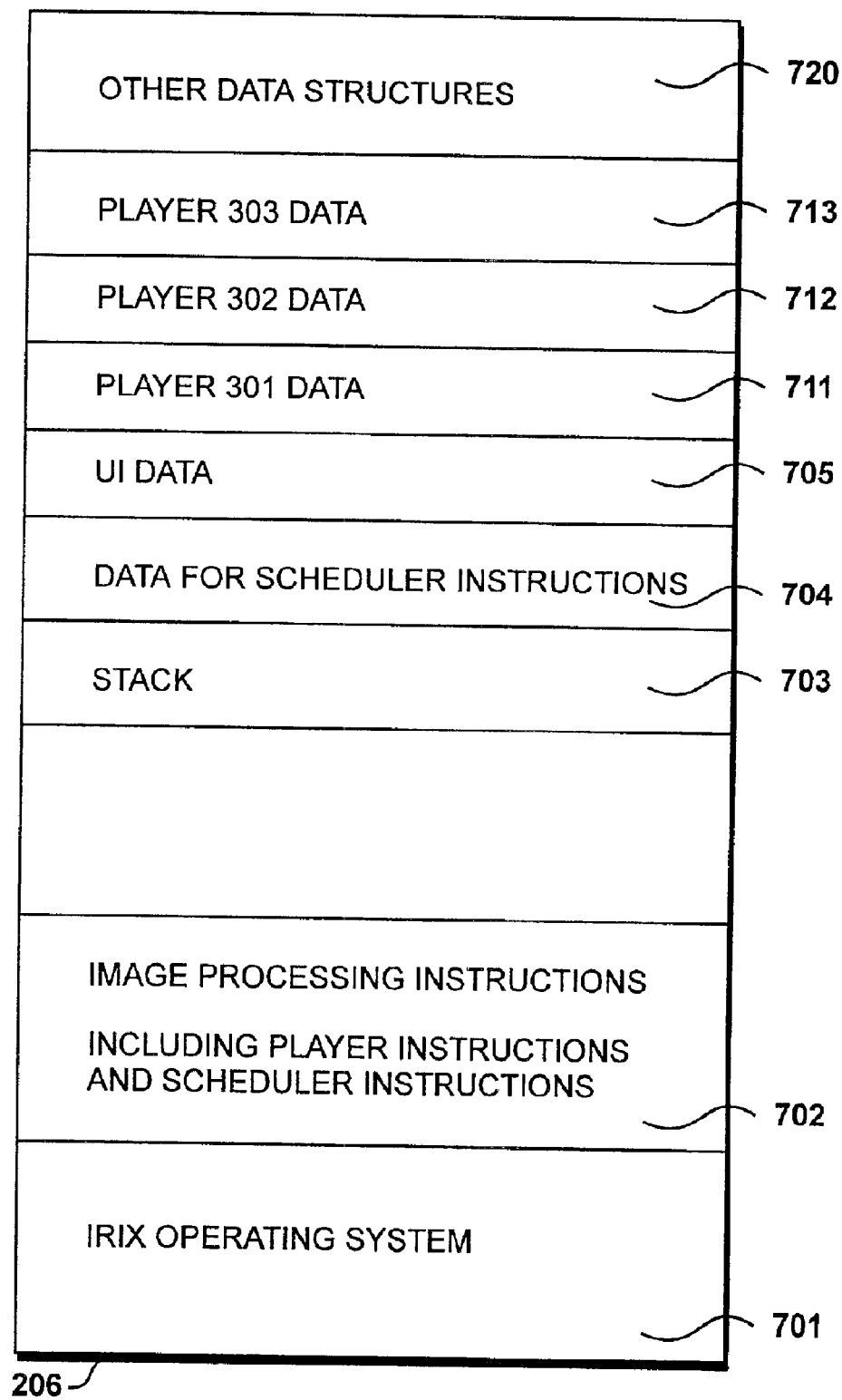
FIG. 7 details contents of the main memory shown in FIG. 2 during image processing, including image processing instructions.

The contents of the main memory 206 shown in FIG. 2, during image processing 404, are detailed in FIG. 7. Irix™ operating system instructions 701 facilitate common processing system functionality that is shared by all the processes operating on the system 101. These include scheduling and prioritisation of the processes, allocation to CPU 201 or CPU 202 of individual process threads, file system management for storage devices 211 and 212, and so on. Image processing instructions 702 include all the instructions for performing image processing. These include player instructions and scheduler instructions. A data stack 703 is provided by the operating system 701 for temporary data storage. Data for scheduler instructions 704 provides storage of information of relevance to the present invention. User interface data 705 facilitates instantiation of the degenerate player that is used to display user interface components or widgets on the display 102. Player data 711, 712 and 713 comprises data for each of the instantiated players 301, 302 and 303 respectively. Other data structures include various data items required for full functioning of the processing system, including scene data that defines how clips and other image-related data are combined to form a final output scene that is rendered by a player.

Figure 8:
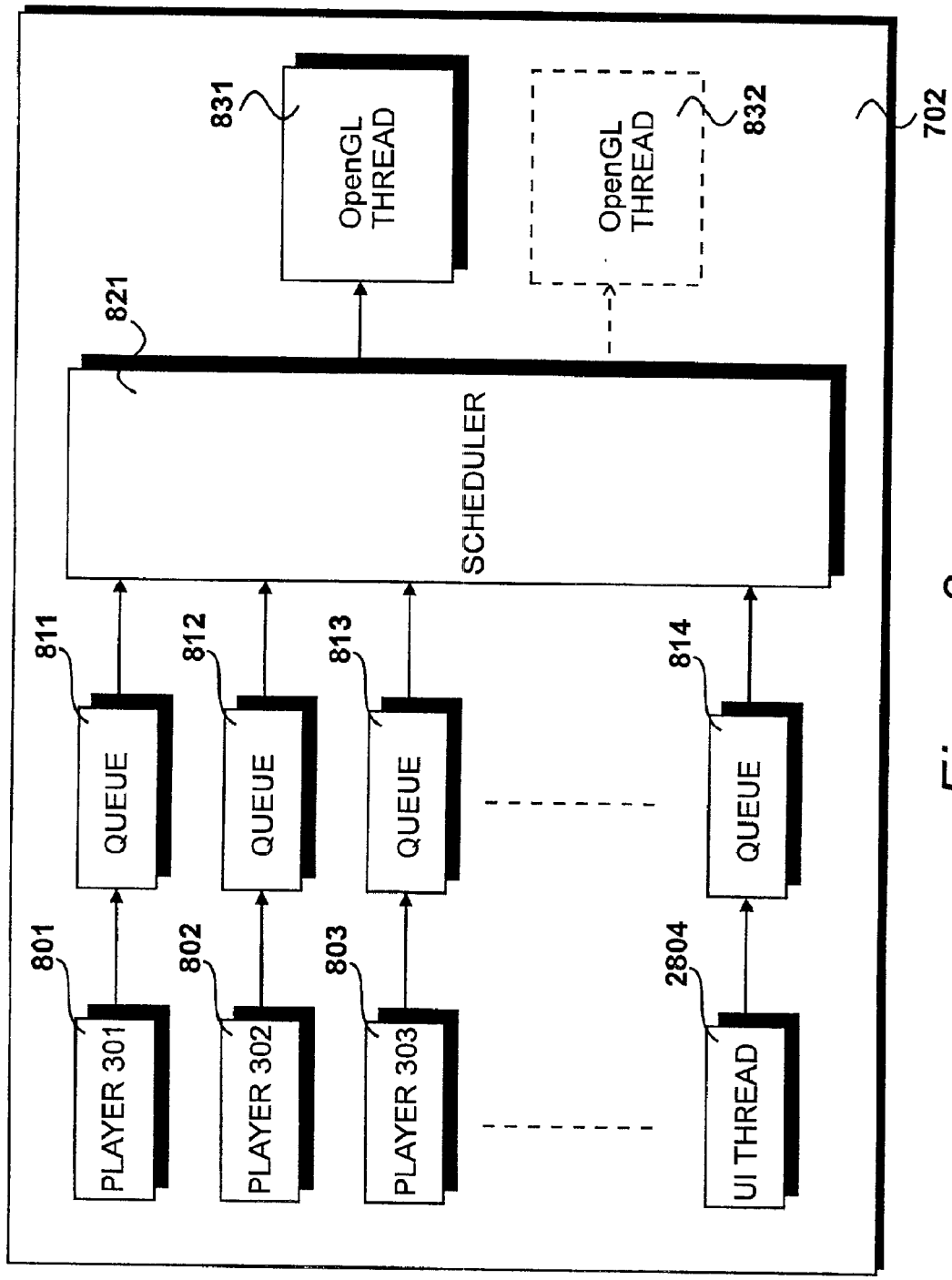
FIG. 8 details the invention including a scheduler 821 and a queue for each player.

The invention is summarised in FIG. 8. This summarises the objects that are created as a result of executing the image processing instructions 702. The three players are represented by instantiated objects 801, 802 and 803 that execute as separate threads. Each player thread 801 to 803 supplies graphics requests to a respective queue 811, 812 and 813. The queues 811 to 813 are interrogated by a scheduler 821, that decides which of the queues shall be serviced next. The UI thread 804 and the UI queue 814 are treated in the same way as the players 801 to 803 and queues 811 to 813. Once the scheduler has decided which queue to service next, it removes the next graphics request from that queue, and supplied this to an OpenGL thread.

Instructions for the scheduler include instructions for identifying the existing conditions of the graphics rendering process 831, comparing required conditions of queued graphics requests from the players 801 to 804 with the existing conditions, and scheduling a preferred graphics request in response to the comparison of conditions. These conditions are, in the present embodiment, the set of state variables of the OpenGL state machine. However, these could be any set of conditions that, when changed, reduce the efficiency of a graphics rendering process. The preferred graphics request is selected in response to a requirement for minimising state changes in the graphics pipeline. This is a form of scheduling, in that from the plurality of queued graphics requests from the players 801 to 804, a single graphics request is selected as being the next to be rendered. Thus, the order in time in which graphics requests are rendered is controlled by the scheduler, in order to minimise the state changes that are required for the requests to be processed.

A graphics request is a small collection of OpenGL draw instructions. In order to render a frame of a complex three dimensional scene, many hundreds of graphics requests would be required. By splitting up the task of drawing a frame of image data into small bundles of graphics commands, the scheduler gets the chance to continuously switch between players in order to optimally choose which graphics request to schedule as being next. Once the preferred graphics request has been scheduled in this way, it is removed from its respective queue 811 to 814 and supplied to the OpenGL thread 831.

Figure 9:
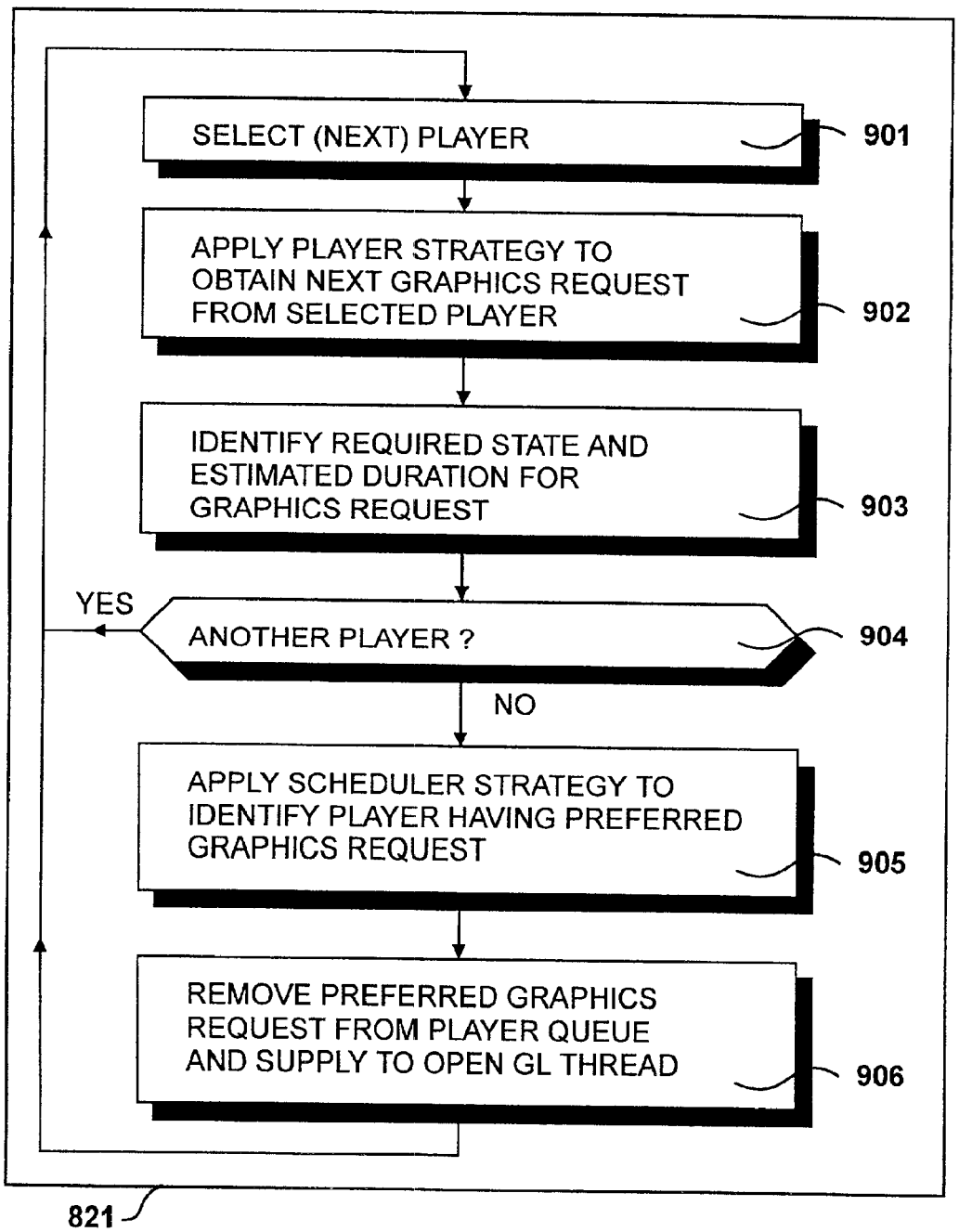
FIG. 9 details the scheduler shown in FIG. 8, including a step of applying a player strategy and a step of applying a scheduler strategy.

Details of the scheduler 821 shown in FIG. 8 are shown in FIG. 9. The scheduler comprises a sequence of instructions that have the effect of executing several steps. At step 901 the first or next of the players 801 to 804 is selected. At step 902 a player strategy is applied to obtain the next graphics request from the player. Strictly speaking, this could involve executing instructions that are part of the player, not the scheduler. For the purposes of convenience of explanation, all scheduling-related instructions shall be considered herein as part of the scheduler, although in practice this may not be the most efficient method of implementation.

The player strategy is applied to the contents of a queue 811 to 814. In its simplest possible method of operation, each queue is a first-in-first-out (FIFO) buffer. However, re-ordering of queued graphics requests, even from the same player, can sometimes be beneficial, and so the player strategy can, if appropriate, cause each queue to yield an appropriate next graphics request, that is not necessarily the same as that which would be supplied by a FIFO buffer.

At step 903 the required state and estimated duration of the graphics request obtained at step 902 are identified. At step 904 a question is asked as to whether there is another player that remains for consideration. If so, control is directed to step 901. Alternatively control is directed to step 905.

At step 905 a scheduler strategy is applied to identify the player having the a preferred graphics request. Effectively this identifies the preferred graphics request from all the players 801 to 804. The scheduler strategy is a strategy distinct from the player strategy, but which operates in a similar way. At step 906 the preferred graphics request is removed from the queue of the player identified at step 905. In summary, graphics requests within a player's queue are sorted according to a player strategy. Each player thereby has a graphics request identified from its queue, that it prefers to be processed next. The scheduler strategy compares each of the graphics requests identified in this way, and also considers the current state of the OpenGL state machine. A graphics request is then removed from a player in accordance with the priority measured by the scheduler strategy. Once this has been done, control is directed back to step 901. Usually there will be a limit to the size of the queue for each player, and so a condition will eventually be reached either where some or all of the queues are empty for a portion of each monitor frame, or, alternatively, where the queues become full and the graphics card 208 is having difficulty in keeping up with the demand placed on it by the players 801 to 804.

Figure 10:
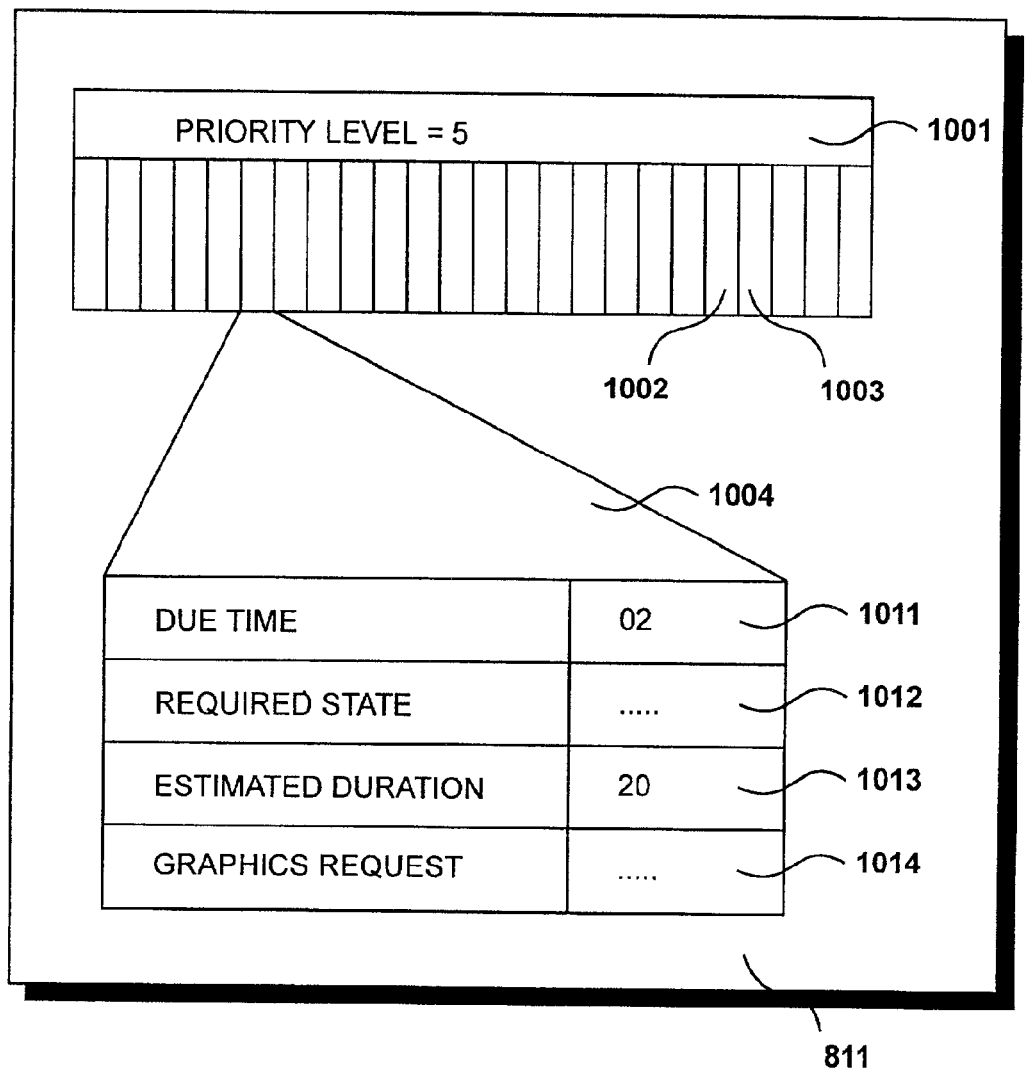
FIG. 10 details a queue of the type shown in FIG. 8.

The graphics queue 811 shown in FIG. 8 is detailed in FIG. 10. Each graphics queue has an associated priority level 1001, that can be used by the scheduler strategy at step 905 in FIG. 9, to influence the choice as to which player's queue to service next. The priority level is expressed as an integer in the range zero to two hundred and fifty-five. The queue comprises graphics requests 1002, 1003 and 1004, each of which encapsulates several OpenGL drawing commands. Each graphics request has associated with it certain data items that are used during the implementation of a strategy.

The due time 1011 is the frame number, offset from the present frame, by which the graphics request should be drawn in order to maintain the correct frame rate for the player. For example, if the monitor's refresh rate is one hundred hertz, and the frame rate for a player is twenty-five hertz, then due times will have values such as 02, 06, 10, 14 and so on, occurring at one in every four frames. If the due time for a particular graphics request is a long way off, then this makes it possible for the scheduler to select a graphics request that is more urgent, even if this requires a significant change of OpenGL state or a full context switch. The due time may be expressed as a frame number, or as being as-soon-as-possible, or whenever there is some spare processing capacity available. User interface widgets usually require updates as fast as possible, whereas some players may only need to be updated as a background process whenever there is some spare processing time on the graphics card.

The required state 1012 specifies the state that is required by the graphics request. This may be compared with the current state of the OpenGL thread 831, and a graphics request requiring the least amount of state change can be selected. The estimated duration 1013 is the estimated time for the graphics request to execute on the graphics card. This information can be used to optimise the scheduling of a graphics request under certain conditions. The graphics request itself is shown at 1014. This comprises a short sequence of OpenGL drawing commands.

Figure 11:
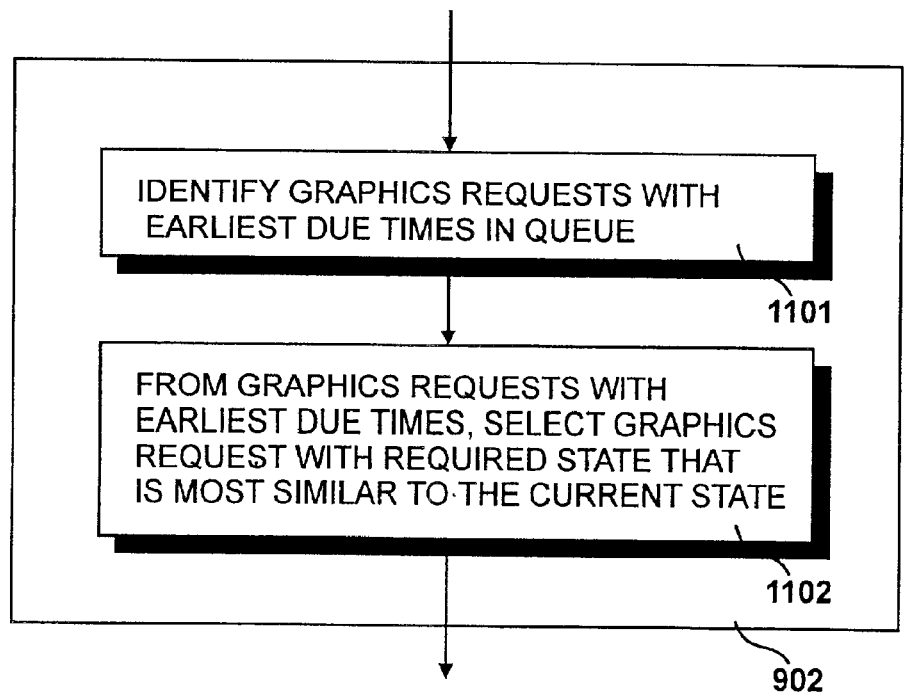
FIG. 11 summarises the step of applying a player strategy shown in FIG. 9.

The player strategy applied at step 902 in FIG. 9 is detailed in FIG. 11. At step 1101 graphics requests with the earliest due times 1011 are identified from within the queue. At step 1102, from the graphics requests identified at step 1101, a graphics request is selected that has a required state 1012 that is most similar to that of the current state of the OpenGL state machine.

Figure 12:
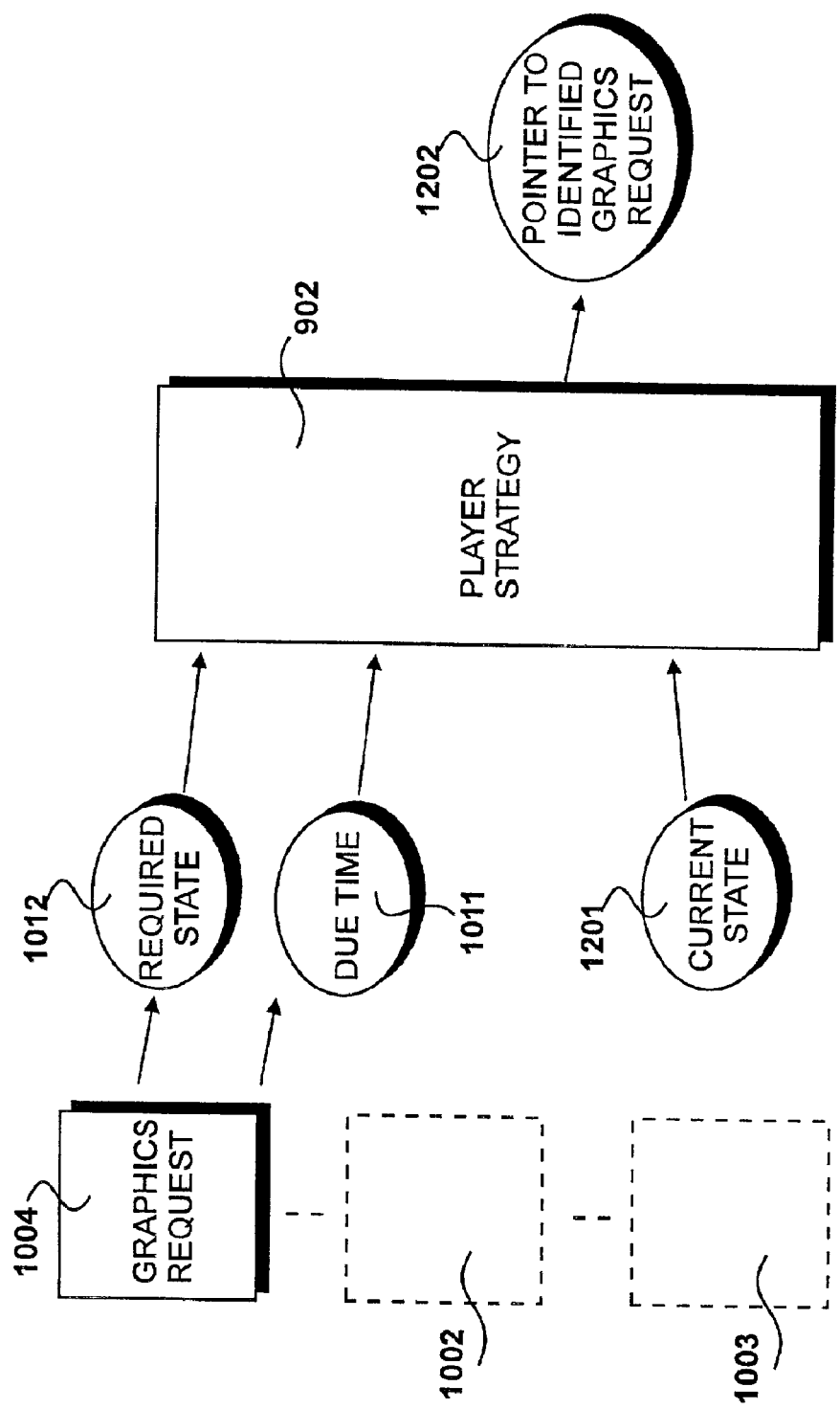
FIG. 12 illustrates the data flow resulting from the steps shown in FIG. 11.

Data flow associated with the player strategy 902 is summarised in FIG. 12. From each graphics request 1002, 1003, 1004 in a queue, the required state 1012 and due time 1011 are identified and supplied to the player strategy 902. The player strategy 902 also received the current state 1201 of the OpenGL state machine as an input. These data items are compared and this results in a single graphics request being selected from the queue, which is identified by means of a pointer 1202. This strategy is an example. Different types of player may be given different strategies, for example a user interface player may be given a different strategy 902 from a normal player. In the present embodiment the strategies are the same. However, it will be understood by those skilled in the art, that several differing strategies may be applied according to context, including selecting a different set of strategies that are optimised for a graphics card from a particular manufacturer. This also applies to the scheduler strategies to be described next.

Figure 13:
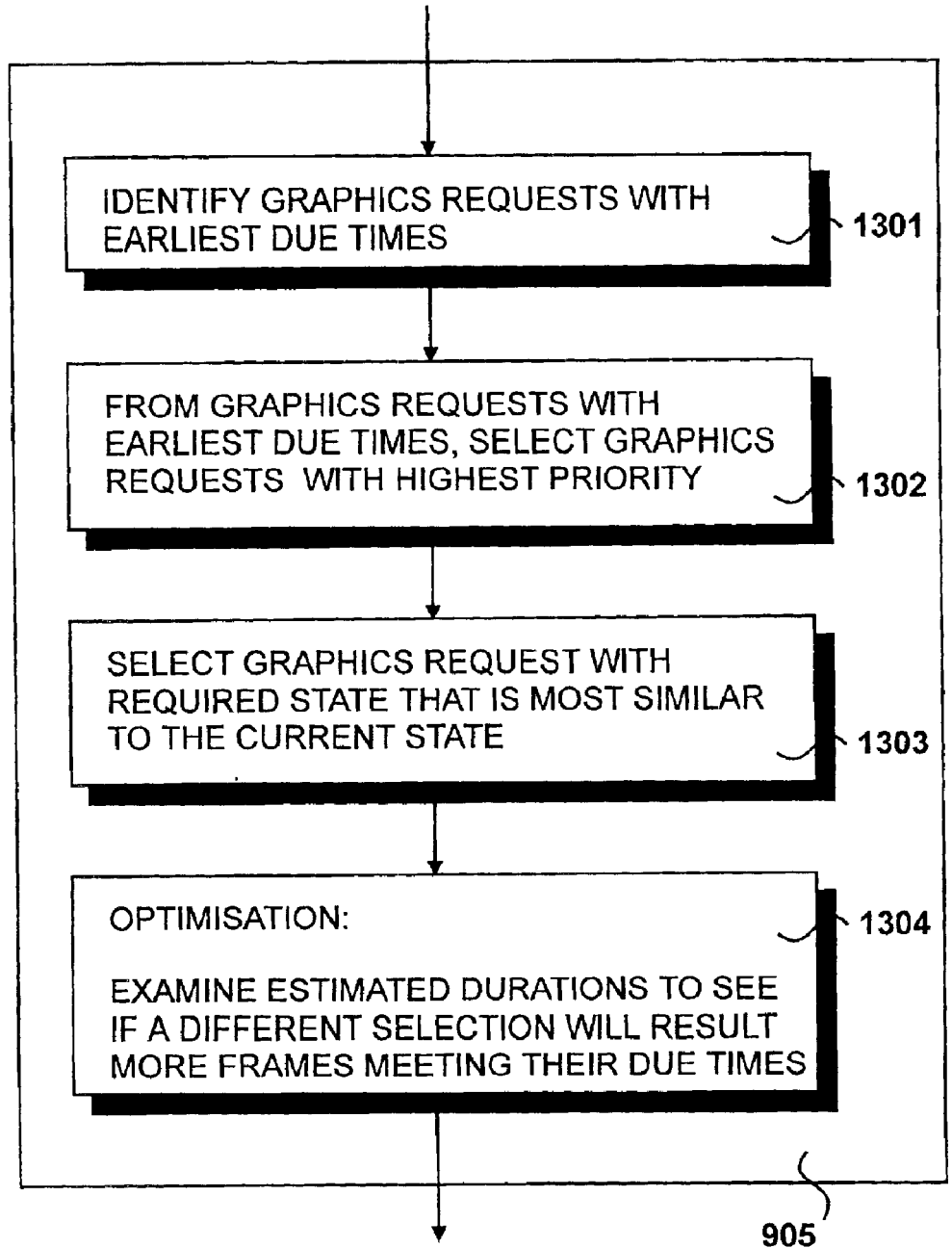
FIG. 13 details the step of applying a scheduler strategy shown in FIG. 9.

The scheduler strategy applied at step 905 in FIG. 9 is detailed in FIG. 13. At step 1301 graphics requests with earliest due times are identified. From these, at step 1302, are selected graphics requests from the queue or queues with highest priority 1001. At step 1303, if more than one graphics request remains for consideration, a graphics request is selected that is most similar to the current state of the OpenGL state machine. Priority levels 1001 are typically the same for several of the queues, resulting in a coarse prioritisation into a few categories such as high, medium and low, being represented as integers such as one, two and three. At step 1304 an optimisation is performed, in which the estimated duration 1013 for several of the identified graphics requests is considered, and an attempt is made to identify a different order of scheduling that would result in more players' frames meeting their due times 1011. If this is possible, the graphics request identified at step 1303 is discarded, and the alternative identified by the optimisation process is selected instead.

Figure 14:
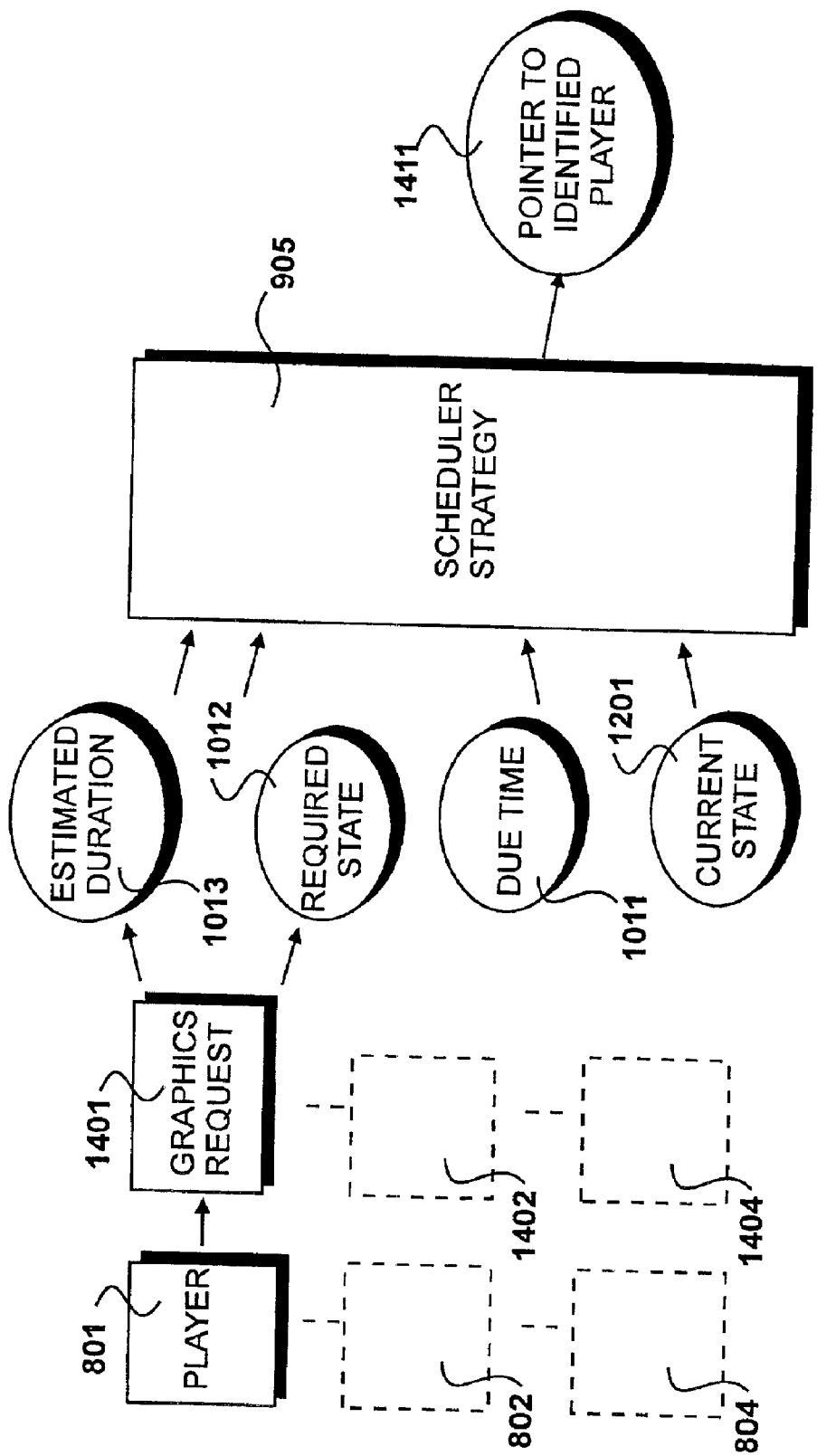
FIG. 14 illustrates the data flow resulting from the steps shown in FIG. 13.

The data flow associated with the implementation of the scheduler strategy 905 is shown in FIG. 14. Each player 801 to 804 has an associated identified graphics request 1401, 1402, 1404. The estimated duration 1013, required state 1012 and due time 1011 of each of these identified graphics requests is supplied to the scheduler strategy 905, in combination with the current state 1201 of the OpenGL thread 831. The scheduler strategy selects a preferred graphics request on the basis of several comparisons, resulting in a pointer 1411 to a player identified as having the preferred graphics request in its queue. Once identified in this way, the scheduler 821 removes the preferred graphics from its queue and passes this on to the OpenGL thread 831.

Figure 15:
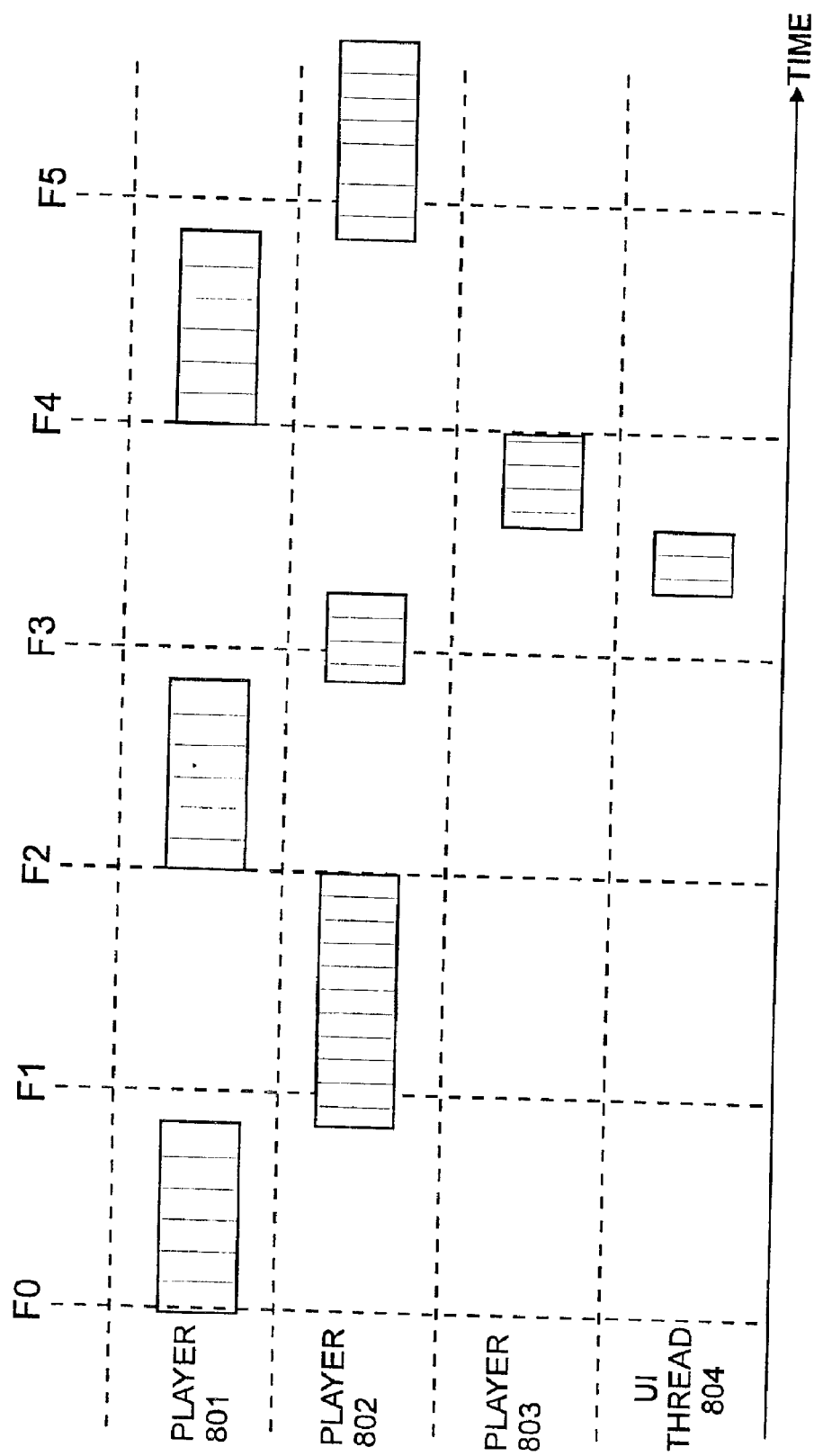
FIG. 15 details timing of graphic request allocation performed by the scheduler shown in FIG. 8.

The consequences and advantages of the invention are shown in the form of a timing diagram of graphics request processing performed by the graphics card 208. Player 801 has a required frame rate of thirty frames a second, and in this example it is assumed that the monitor refresh rate is sixty frames a second. Player 801 has a high priority and so graphics requests for player 801 tend to get rendered before any other graphics requests. Player 801 gets priority and its requests are shown in FIG. 15 as occurring in large chunks every other frame. It is not necessary for there to be an integer relationship between frame rate for a player and the refresh rate of the monitor. The player updates its due time as a frame number in accordance with a discarded remainder accumulation, and will result in a pattern of frame activity that changes, for example, 2,2,3,2,2,2,3 if there is a slight deliberate decrease in the frame rate of player 801. Player 802 has a frame rate of fifteen hertz, and a lower priority than player 801. However, it can be seen from the timing diagram that it still is able to meet its due time of frame, frame 4 and so on. Player 803 is a low priority non-specific frame rate player that only gets allocated time when none of the other players requires attention. The UI thread 804 has highest priority, but requires very little to be drawing to be performed, compared to the other players 801 to 803.

The graphics requests are not of a fixed size, but they are always reasonably small, so that the scheduler 821 gets a chance to switch between players whenever this is appropriate. The invention facilitates multitasking of the graphics card 208 between multiple competing asynchronous players 801 to 804, and allocates its resources in accordance with a combination of due time and required state information. This minimises the unnecessary amount of state changes that are required to occur within the graphics card and its OpenGL state machine, while at the same time ensuring that multiple players having unrelated frame rates continue to update without interfering with each other. The players 801 to 804 may have similar or widely different required OpenGL states for their graphics requests, whichever condition arises, however, in response to user configuration of the players, the invention ensures that optimal use is made of the available graphics hardware.

The invention has been described without reference to double buffering, which is a technique that is used in all high quality image processing systems. Double buffering has been omitted from the description for the purpose of simplifying the description. However, those skilled in the art will understand that the preferred embodiment of the invention includes the use of double buffering techniques. This may be implemented in the following way. Once a player has supplied all the graphics requests required for a particular frame, the player sets a flag indicating that once all the queued requests for that frame have been passed to the graphics thread, then the front and back buffers for that player should be swapped. Each player has its own front and back buffers.

What we claim is:

1. Apparatus for processing image data comprising storage means for storing image processing instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may operate asynchronously;

said processing means is configurable by said player instructions such that graphics requests are generated by each said player in response to the scene data associated with each respective player; and said image processing instructions include scheduling instructions such that said processing means is configurable to supply graphics requests generated by said players to a graphics rendering process;

wherein said scheduling instructions include steps of:

(a) identifying existing conditions of said graphics rendering process;

(b) comparing required conditions of graphics requests from a plurality of said players with said existing conditions; and (c) scheduling a preferred graphics request in response to comparisons performed at step (b).

2. Apparatus for processing image data comprising storage means for storing image processing instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may have a different frame rate;

said processing means is configurable by said player instructions such that graphics requests are generated by each said player in response to the scene data associated with each respective player, in order to draw frames of scene data for the player at its respective frame rate; and said image processing instructions include scheduling instructions such that said processing means is configurable to supply graphics requests generated by said players to a graphics rendering process;

wherein said scheduling instructions include steps of:

(a) identifying existing conditions of said graphics rendering process;

(b) comparing said existing conditions with required conditions of player graphics requests;

(c) selecting a preferred graphics request in response to said comparison of required conditions;

(d) scheduling a preferred player by processing the due time of said preferred graphics requests of the players with said required and existing conditions; and (e) transferring a preferred graphics request from said scheduled player to said graphics rendering process.

3. Apparatus according to claim 1 or claim 2, wherein said players include a player for drawing user interface widgets.

4. Apparatus according to claim 2, wherein said due time for a frame is defined by its frame rate.

5. Apparatus according to claim 2, wherein said graphics rendering process is multi-threaded.

6. Apparatus according to claim 5, wherein individual threads in said graphics rendering process are allocated graphics requests in response to a load balancing strategy.

7. Apparatus according to claim 2, wherein said selecting step is performed so as to minimise the required change of state in said graphics rendering process.

8. Apparatus according to claim 2, wherein said scheduling instructions include frame control strategy instructions and or data specific to a hardware implementation of the graphics rendering process.

9. Apparatus for processing image data comprising storage means for storing image processing instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may have a different frame rate;

said processing means is configurable by said player instructions such that graphics requests are generated by each said player in response to the scene data associated with each respective player, in order to draw frames of scene data for the player at its respective frame rate; and said image processing instructions include scheduling instructions such that said processing means is configurable to supply graphics requests generated by said players to a graphics rendering process;

wherein (a) each frame for a player is defined by multiple graphics requests;

(b) graphics requests are selected from players so as to minimise state changes while switching the rendering process from player to player; and (c) players running at higher frame rates have their graphics requests selected more frequently than those running at lower frame rates.

10. Apparatus according to claim 9, wherein said scheduling instructions include instructions such that each player is allocated a strategy for prioritising its graphics requests.

11. A method of processing image data in an image processing system comprising storage means for storing image processing instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may operate asynchronously;

said processing means is configurable by said player instructions such that graphics requests are generated by each said player in response to the scene data associated with each respective player; and said image processing instructions include scheduling instructions such that said processing means is configurable to supply graphics requests generated by said players to a graphics rendering process;

wherein
said scheduling instructions facilitate steps of:
(a) identifying existing conditions of said graphics rendering process;
(b) comparing required conditions of graphics requests from a plurality of said players with said existing conditions; and
(c) scheduling a preferred graphics request in response to comparisons performed at step (b).

12. A method of processing image data in an image processing system comprising storage means for storing image processing instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may have a different frame rate;

said processing means is configurable by said player instructions such that graphics requests are generated by each said player in response to the scene data associated with each respective player, in order to draw frames of scene data for the player at its respective frame rate; and said image processing instructions include scheduling instructions such that said processing means is configurable to supply graphics requests generated by said players to a graphics rendering process;

wherein
said scheduling instructions facilitate steps of:
(a) identifying existing conditions of said graphics rendering process;
(b) comparing said existing conditions with required conditions of player graphics requests;
(c) selecting a preferred graphics request in response to said comparison of required conditions;
(d) scheduling a preferred player by processing the due time of said preferred graphics requests of the players with said required and existing conditions; and
(e) transferring a preferred graphics request from said scheduled player to said graphics rendering process.

13. A method according to claim 11 or claim 12, wherein said players include a player that draws user interface widgets.

14. A method according to claim 12, wherein said due time for a frame is defined by its frame rate.

15. A method according to claim 12, wherein said graphics rendering process is multi-threaded.

16. A method according to claim 15, wherein individual threads in said graphics rendering process are allocated graphics requests in response to a load balancing strategy.

17. A method according to claim 12, wherein said selecting step is performed so as to minimise the required change of state in said graphics rendering process.

18. A method according to claim 12, wherein said scheduling instructions include frame control strategy instructions and or data specific to a hardware implementation of the graphics rendering process.

19. A method of processing image data in an image processing system comprising storage means for storing image processing instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may have a different frame rate;

said processing means is configurable by said player instructions such that graphics requests are generated by each said player in response to the scene data associated with each respective player, in order to draw frames of scene data for the player at its respective frame rate; and said image processing instructions include scheduling instructions such that said processing means is configurable to supply graphics requests generated by said players to a graphics rendering process;

wherein
(a) each frame for a player is defined by multiple graphics requests;
(b) graphics requests are selected from players so as to minimise state changes while switching the rendering process from player to player; and
(c) players running at higher frame rates have their graphics requests selected more frequently than those running at lower frame rates.

20. A method according to claim 19, wherein each said player is allocated a strategy for prioritising its graphics requests.

21. A computer-readable medium having computer-readable instructions executable by a computer configurable for image processing, said computer including storage means for storing image processing instructions derived from said computer-executable instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may operate asynchronously;

said processing means is configurable by said player instructions such that graphics requests are generated by each said player in response to the scene data associated with each respective player; and said image processing instructions include scheduling instructions such that said processing means is configurable to supply graphics requests generated by said players to a graphics rendering process;

wherein said scheduling instructions include steps of:

(a) identifying existing conditions of said graphics rendering process;

(b) comparing required conditions of graphics requests from a plurality of said players with said existing conditions; and (c) scheduling a preferred graphics request in response to comparisons performed at step (b).

22. A computer-readable medium having computer-readable instructions executable by a computer configurable for image processing, said computer including storage means for storing image processing instructions derived from said computer-executable instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may have a different frame rate;

said processing means is configurable by said player instructions such that graphics requests are generated by each said player in response to the scene data associated with each respective player, in order to draw frames of scene data for the player at its respective frame rate; and said image processing instructions include scheduling instructions such that said processing means is configurable to supply graphics requests generated by said players to a graphics rendering process;

wherein said scheduling instructions include steps of:

(a) identifying existing conditions of said graphics rendering process;

(b) comparing said existing conditions with required conditions of player graphics requests;

(c) selecting a preferred graphics request in response to said comparison of required conditions;

(d) scheduling a preferred player by processing the due time of said preferred graphics requests of the players with said required and existing conditions; and (e) transferring a preferred graphics request from said scheduled player to said graphics rendering process.

23. A computer-readable medium according to claim 21 or claim 22, wherein said players include a player for drawing user interface widgets.

24. A computer-readable medium according to claim 22, wherein said due time for a frame is defined by its frame rate.

25. A computer-readable medium according to claim 22, wherein said graphics rendering process is multi-threaded.

26. A computer-readable medium according to claim 25, wherein individual threads in said graphics rendering process are allocated graphics requests in response to a load balancing strategy.

27. A computer-readable medium according to claim 22, wherein said selecting step is performed so as to minimise the required change of state in said graphics rendering process.

28. A computer-readable medium according to claim 22, wherein said scheduling instructions include frame control strategy instructions and or data specific to a hardware implementation of the graphics rendering process.

29. A computer-readable medium having computer-readable instructions executable by a computer configurable for image processing, said computer including storage means for storing image processing instructions derived from said computer-executable instructions, memory means for storing said image processing instructions during their execution and image data in the form of scene data for one or a plurality of animated scenes, and processing means;

said image processing instructions include player instructions for generating graphics requests to render an animated scene, and said processing means is configurable by said image processing instructions to instantiate a plurality of players, each of which comprises player data and at least one pointer to said player instructions, such that each player may have a different frame rate;

said processing means is configurable by said player instructions such that graphics requests are generated by each said player in response to the scene data associated with each respective player, in order to draw frames of scene data for the player at its respective frame rate; and said image processing instructions include scheduling instructions such that said processing means is configurable to supply graphics requests generated by said players to a graphics rendering process;

wherein (a) each frame for a player is defined by multiple graphics requests;

(b) graphics requests are selected from players so as to minimise state changes while switching the rendering process from player to player; and (c) players running at higher frame rates have their graphics requests selected more frequently than those running at lower frame rates.

30. A computer-readable medium according to claim 29, wherein said scheduling instructions include instructions such that each player is allocated a strategy for prioritising its graphics requests.

* * * * *